US012768439B2

(12) United States Patent
Lokhande

(10) Patent No.: US 12,768,439 B2
(45) Date of Patent: Oct. 20, 2026

(54) ASSEMBLY INCLUDING A HOUSING AND A VENT

(71) Applicant: Schaeffler Technologies AG & Co. KG, Herzogenaurach (DE)

(72) Inventor: Sarang Lokhande, Brunswick, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/955,369

(22) Filed: Nov. 21, 2024

(65) Prior Publication Data

US 2026/0139732 A1 May 21, 2026

(51) Int. Cl.
*F16H 57/02* (2012.01)
*F16H 57/027* (2012.01)

(52) U.S. Cl.
CPC ....... *F16H 57/027* (2013.01); *B01D 2265/02* (2013.01); *B01D 2279/35* (2013.01)

(58) Field of Classification Search
CPC .............. F16H 57/027; B01D 2265/02; B01D 2279/35
See application file for complete search history.

(56) References Cited

U.S. PATENT DOCUMENTS

| | | | | |
|---|---|---|---|---|
| 1,639,670 A * | 8/1927 | Rydner | F16K 24/04 55/516 |
| 8,360,168 B2 * | 1/2013 | Kakiuchi | F16H 57/027 173/104 |
| 11,408,492 B2 * | 8/2022 | Shimizu | F16H 57/027 |
| 11,592,131 B2 * | 2/2023 | Derom | F16L 37/133 |
| 2020/0318727 A1 * | 10/2020 | Ege | F16H 57/0461 |
| 2020/0368662 A1 * | 11/2020 | Oostveen | B29C 45/14336 |

FOREIGN PATENT DOCUMENTS

| | | | | |
|---|---|---|---|---|
| CN | 101385924 A * | 3/2009 | |
| CN | 105889471 A * | 8/2016 | F16H 57/027 |
| CN | 108119637 A * | 6/2018 | F16H 57/027 |
| CN | 110061588 A * | 7/2019 | H02K 7/10 |
| CN | 111720526 A * | 9/2020 | F16H 57/0416 |
| CN | 115355304 A * | 11/2022 | F16H 57/027 |
| CN | 117249225 A * | 12/2023 | F16H 57/027 |
| CN | 117570183 A * | 2/2024 | F16H 57/029 |
| CN | 119844543 A * | 4/2025 | B01D 50/20 |
| DE | 102007052150 A1 * | 5/2009 | F16H 57/027 |

(Continued)

OTHER PUBLICATIONS

Machine translation of KR 20210060926 A obtained on Dec. 4, 2025.*

(Continued)

*Primary Examiner* — Adam D Rogers
(74) *Attorney, Agent, or Firm* — Price Heneveld LLP

(57) ABSTRACT

A vent includes a casing that defines a hollow that extends from a first opening to a second opening, a filter that extends across the first opening and is configured to allow air to pass therethrough, and a shield that extends within the hollow defined by the casing configured to allow air to pass therethrough and restrict oil from passing therethrough. The shield has at least one retention feature that engages the casing to prevent removal of the shield from the hollow through the first opening.

15 Claims, 5 Drawing Sheets

(56) References Cited

FOREIGN PATENT DOCUMENTS

| | | | | | |
|---|---|---|---|---|---|
| DE | 102009005749 | A1 | * | 7/2010 | F16H 57/027 |
| DE | 102014215127 | B3 | * | 10/2015 | F16H 57/027 |
| DE | 102015105243 | A1 | * | 10/2015 | F16H 57/027 |
| DE | 102017125603 | A1 | * | 5/2019 | F16H 57/027 |
| DE | 102017129586 | A1 | * | 6/2019 | F16H 57/027 |
| DE | 102019218415 | A1 | * | 6/2021 | F16H 57/027 |
| DE | 102020119593 | A1 | * | 1/2022 | H05K 5/0216 |
| EP | 3098028 | A1 | * | 11/2016 | B25F 5/001 |
| EP | 3098029 | A1 | * | 11/2016 | B25F 5/001 |
| JP | H0658390 | A | * | 3/1994 | F16H 57/0489 |
| JP | 2002106687 | A | * | 4/2002 | F16H 57/027 |
| KR | 19980020840 | U | * | 7/1998 | F16H 57/027 |
| KR | 20210060926 | A | * | 5/2021 | F16H 57/029 |
| WO | WO-2016135225 | A1 | * | 9/2016 | F16H 57/027 |
| WO | WO-2021121761 | A1 | * | 6/2021 | F16H 57/027 |

OTHER PUBLICATIONS

Machine translation of CN 111720526 A obtained on Dec. 4, 2025.*
Machine translation of WO 2016/135225 A1 obtained on Dec. 4, 2025.*
Machine translation of EP 3098029 A1 obtained on Dec. 4, 2025.*
Machine translation of DE 102017125603 A1 obtained on Dec. 4, 2025.*
Machine translation of DE 102015105243 A1 obtained on Dec. 12, 2025.*
"Stemco 359-6137 ESP Filtered Drive Axle Vent," https://triplertruckparts.com/stemco-esp-filtered-drive-axle-vent/, downloaded Nov. 21, 2024, 2 pages.
"BSPT 1/4 Stainless Steel Breather Vent with Mesh Screen," http://pneuflexpneumatic.com/bspt-1-4-stainless-steel-breather-vent-silencer-with-mesh-screen.html, downloaded Nov. 21, 2024, 3 pages.
Photographs of Tesla Model 3Y E-Axle Vent, 2023, 1 page.

* cited by examiner

ASSEMBLY INCLUDING A HOUSING AND A VENT

FIELD OF THE DISCLOSURE

The present disclosure generally relates to an assembly for a vehicle. More specifically, the present disclosure relates to an assembly for a vehicle that includes a housing and a vent that is configured to be received within the housing of the assembly.

BACKGROUND OF THE DISCLOSURE

Assemblies for vehicles, such as electric axle assemblies, often include reservoirs for fluids, such as oil. It is generally desirable for the ventilation of air from these assemblies and the retention of the fluids, such as oil.

SUMMARY OF THE DISCLOSURE

According to a first aspect of the present disclosure, a vent includes a casing that defines a hollow that extends from a first opening to a second opening, a filter that extends across the first opening and is configured to allow air to pass therethrough, and a shield that extends within the hollow defined by the casing configured to allow air to pass therethrough and restrict oil from passing therethrough. The shield has at least one retention feature that engages the casing to prevent removal of the shield from the hollow through the first opening.

Embodiments of the first aspect of the disclosure can include any one or a combination of the following features:

- the shield includes first and second side members that extend lengthwise within the hollow along the casing and a restrictor structure that extends between the first and second side members, wherein the at least one retention feature extends outward from at least one of the first and second side members to engage an engagement face of the casing to prevent removal of the shield from the hollow through the first opening;
- the at least one retention feature comprises a first retention feature that extends outward from the first side member and includes a deflector portion and a stop portion, the deflector portion is configured to contact the casing during insertion of the shield into the hollow, such that the first side member elastically deforms toward the second side member as the first retention feature travels toward the engagement face of the casing and resiliently rebounds away from the second side member as the deflector portion travels beyond the engagement face of the casing, and the stop portion is configured to abut the engagement face of the casing to prevent removal of the shield from the hollow through the first opening;
- the engagement face is formed at an end of the casing that defines the second opening, such that the first side member extends through the second opening and the first retention feature is positioned outside of the hollow;
- the at least one retention feature further comprises a second retention feature that extends outward from the second side member and includes a deflector portion and a stop portion, the deflector portion of the second retention feature is configured to contact the casing during insertion of the shield into the hollow, such that the second side member elastically deforms toward the first side member as the second retention feature travels toward the engagement face of the casing and resiliently rebounds away from the first side member as the deflector portion of the second retention feature travels beyond the engagement face of the casing, and the stop portion of the second retention feature is configured to abut the engagement face of the casing to prevent removal of the shield from the hollow through the first opening;
- the restrictor structure of the shield forms a labyrinth configured to restrict passage of oil therethrough and allow passage of air therethrough in a serpentine flow path;
- the restrictor structure includes first and second steps that extend between the first and second side members and are in a spaced relationship with each other, such that the first step is positioned between the first opening and the second step;
- the first step cooperates with the casing to define a first gap, and the second step cooperates with the casing to define a second gap;
- the first and second gaps are offset from each other, such that an axis extending parallel to a lengthwise direction of the first side member that intersects the first gap does not intersect the second gap;
- the restrictor structure further includes a third step that extends between the first and second side members and is in a spaced relationship with the first and second steps, such that the second step is positioned between the first and third steps, and the third step cooperates with the casing to define a third gap that the axis intersects;
- a cap that engages the casing and extends over the filter; and
- the casing defines a plurality of ports positioned between the cap and the hollow.

According to a second aspect of the present disclosure, a housing for receiving a vent therein includes an interior surface that defines a volume configured to receive oil therein, and an exterior surface opposite the interior surface and having a receiving portion that includes a floor and a side wall extending from the floor to an end of the side wall. The floor and the side wall cooperate to define a receiving cavity that is configured to receive the vent therein. Further, the side wall of the receiving portion defines an aperture that extends from the exterior surface to the interior surface.

Embodiments of the second aspect of the disclosure can include any one or a combination of the following features:

- at least a portion of the side wall extends one of cylindrically or frusto-conically about an axis, and the receiving cavity is configured to receive the vent therein via displacement of the vent toward the floor parallel to the axis;
- the floor is nearer than the end of the side wall to the aperture; and
- the aperture is adjacent to the floor of the receiving portion.

According to a third aspect of the present disclosure, an assembly for a vehicle includes a housing and a vent. The housing includes an interior surface that defines a volume configured to receive oil therein and an exterior surface opposite the interior surface and having a receiving portion that includes a floor and a side wall extending from the floor to an end of the side wall. The floor and the side wall cooperate to define a receiving cavity, and the side wall of the receiving portion defines an aperture that extends from the exterior surface to the interior surface. The vent is received within the receiving cavity and includes a casing that defines a hollow that extends from a first opening to a second opening, a filter that extends across the first opening and is configured to allow air to pass therethrough, and a shield that extends within the hollow defined by the casing configured to allow air to pass therethrough and restrict oil from passing therethrough.

Embodiments of the third aspect of the disclosure can include any one or a combination of the following features:

- the shield includes at least one retention feature that engages the casing to prevent removal of the shield from the hollow through the first opening;
- the shield includes first and second side members that extend lengthwise within the hollow along the casing and a restrictor structure that extends between the first and second side members, wherein the at least one retention feature extends outward from at least one of the first and second side members to engage an engagement face of the casing to prevent removal of the shield from the hollow through the first opening; and
- the aperture is adjacent to the floor of the receiving portion.

These and other features, advantages, and objects of the present disclosure will be further understood and appreciated by those skilled in the art by reference to the following specification, claims, and appended drawings.

Figure 1:
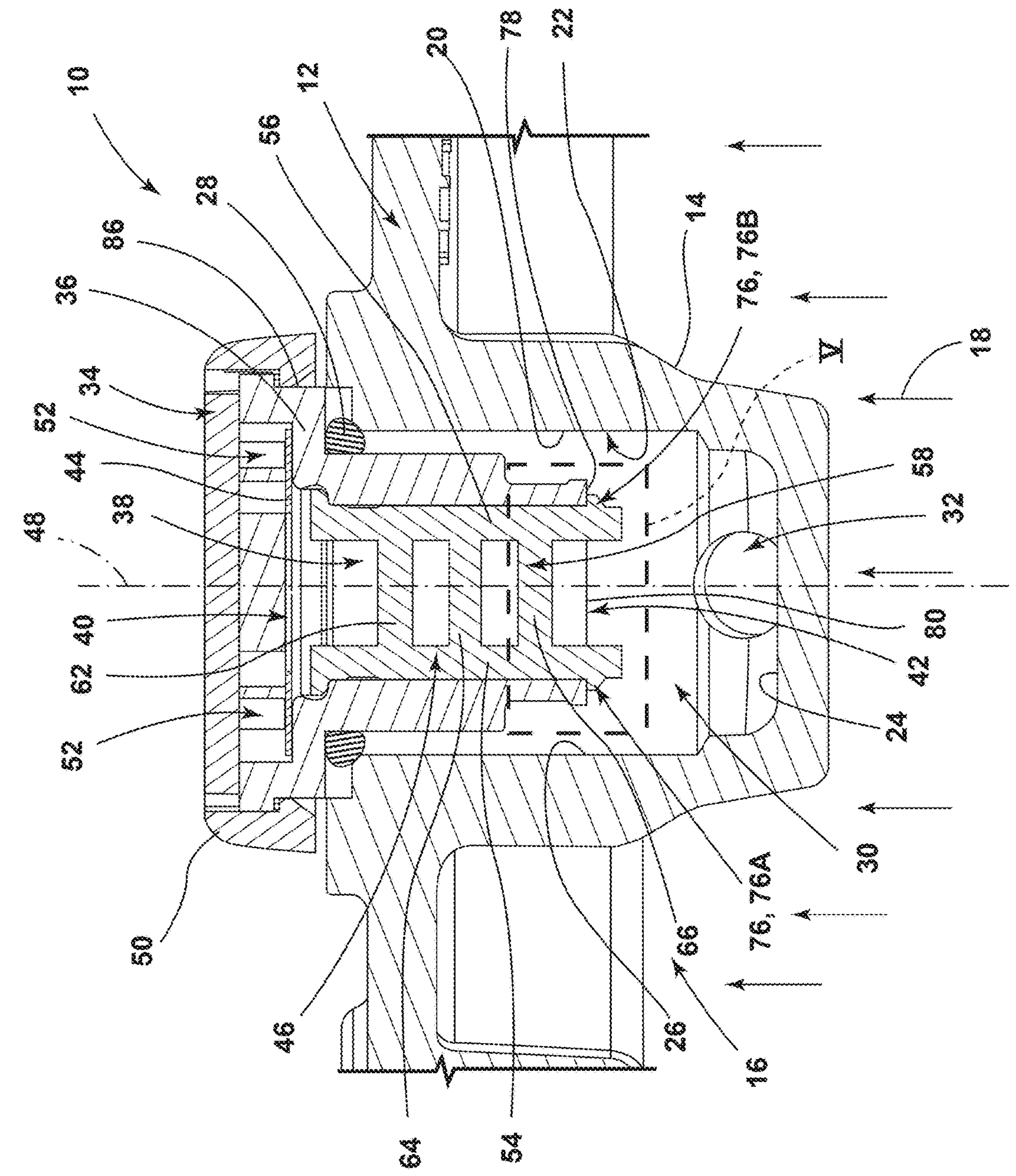
FIG. 1 is a cross-sectional view of a portion of an assembly, illustrating a housing that defines a receiving cavity and a vent that is received within the receiving cavity, according to one embodiment.

The components in the figures are not necessarily to scale, emphasis instead being placed upon illustrating the principles described herein.

DETAILED DESCRIPTION

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-5, an assembly 10 for a vehicle includes a housing 12. The housing 12 includes an interior surface 14 that defines a volume 16 configured to receive oil 18 therein and an exterior surface 20 opposite the interior surface 14. The exterior surface 20 includes a receiving portion 22. The receiving portion 22 includes a floor 24 and a side wall 26 that extends from the floor 24 to an end 28 of the side wall 26. The floor 24 and the side wall 26 cooperate to define a receiving cavity 30. The side wall 26 of the receiving portion 22 defines an aperture 32 that extends from the exterior surface 20 to the interior surface 14 of the housing 12. The assembly 10 for the vehicle further includes a vent 34. The vent 34 is received within the receiving cavity 30 and includes a casing 36. The casing 36 defines a hollow 38 that extends from a first opening 40 to a second opening 42. The vent 34 includes a filter 44 that extends across the first opening 40 and is configured to allow air to pass therethrough. The vent 34 further includes a shield 46 that extends within the hollow 38 defined by the casing 36. The shield 46 is configured to allow air to pass therethrough and restrict oil 18 from passing therethrough.

Figure 2:
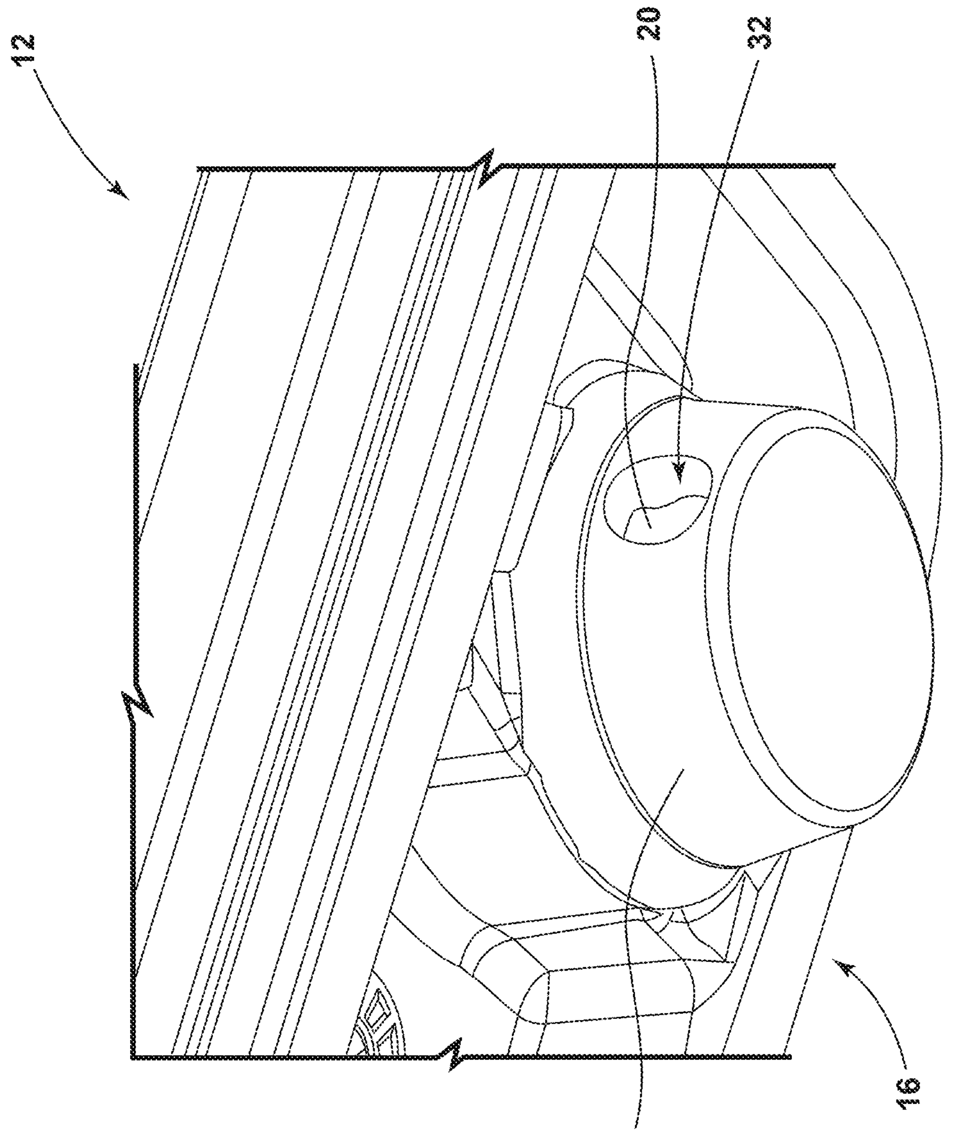
FIG. 2 is a perspective view of a portion of a housing of an assembly, illustrating an aperture that provides for fluid communication between a volume defined by an interior surface of the housing and a receiving cavity defined by an exterior surface of the housing, according to one embodiment.

Referring now to FIGS. 1 and 2, the assembly 10 for the vehicle includes the housing 12. The housing 12 includes the interior surface 14 that defines the volume 16. In various implementations, the volume 16 defined by the interior surface 14 of the housing 12 acts as a reservoir for fluid 18, such as oil 18. Further, a variety of components of the assembly 10 for the vehicle may be disposed within the volume 16 defined by the interior surface 14. For example, in an exemplary embodiment of the assembly 10, the assembly 10 may be an electric axle assembly 10 for the vehicle and the housing 12 may be an electric axle housing 12. As such, the interior surface 14 may define the volume 16 within the axle housing 12, and various components (e.g., differential, gear systems, etc.) may be disposed within the volume 16 along with oil 18 for lubrication and cooling of the components of the electric axle assembly 10. A variety of types of assemblies 10 for vehicles are contemplated.

As illustrated in FIGS. 1 and 2, the housing 12 of the assembly 10 includes the exterior surface 20 that is opposite the interior surface 14. As illustrated in FIG. 1, the exterior surface 20 includes the receiving portion 22. The receiving portion 22 may be configured to receive the vent 34 of the assembly 10 therein, as described further herein. In the embodiment illustrated in FIG. 1, the receiving portion 22 of the exterior surface 20 of the housing 12 includes the floor 24 and the side wall 26 that extends from the floor 24 to the end 28 of the side wall 26. In various implementations, the floor 24 and the side wall 26 cooperate to define the receiving cavity 30 into which the vent 34 is configured to be received, and the end 28 of the side wall 26 defines an opening to the receiving cavity 30 opposite the floor 24 of the receiving portion 22. As illustrated in FIG. 1, in some embodiments, at least a portion of the side wall 26 of the receiving portion 22 of the exterior surface 20 extends cylindrically or frusto-conically about an axis 48.

In various implementations, the vent 34 may be configured to be inserted into the receiving cavity 30 defined by the exterior surface 20 of the housing 12 in a direction that is parallel to the axis 48. As illustrated in FIG. 1, in some implementations, the portion of the interior surface 14 of the housing 12 that is opposite the side wall 26 of the exterior surface 20 of the housing 12 may extend cylindrically or frusto-conically about the axis 48.

Referring now to FIGS. 1 and 2, the aperture 32 extends from the exterior surface 20 of the housing 12 to the interior surface 14 of the housing 12. In various implementations, the side wall 26 of the receiving portion 22 defines the aperture 32 that extends from the exterior surface 20 to the interior surface 14. In some implementations, the floor 24 is nearer than the end 28 of the side wall 26 to the aperture 32. In various implementations, the aperture 32 is adjacent to the floor 24 of the receiving portion 22. In the embodiment illustrated in FIGS. 1 and 2, the aperture 32 is a borehole that extends from the exterior surface 20 to the interior surface 14 in a direction that is substantially perpendicular to the axis 48. In the illustrated embodiment, the aperture 32 is adjacent to the floor 24. Orienting the aperture 32 on the housing 12 in this way may aid in ensuring that excess fluid 18 (e.g., oil 18) that is traveling generally parallel to the axis 48, as illustrated in FIG. 1, does not flow through the aperture 32 and out of the housing 12, as may occur were the aperture 32 extending through the floor 24 of the exterior surface 20 parallel to the axis 48.

Figure 3:
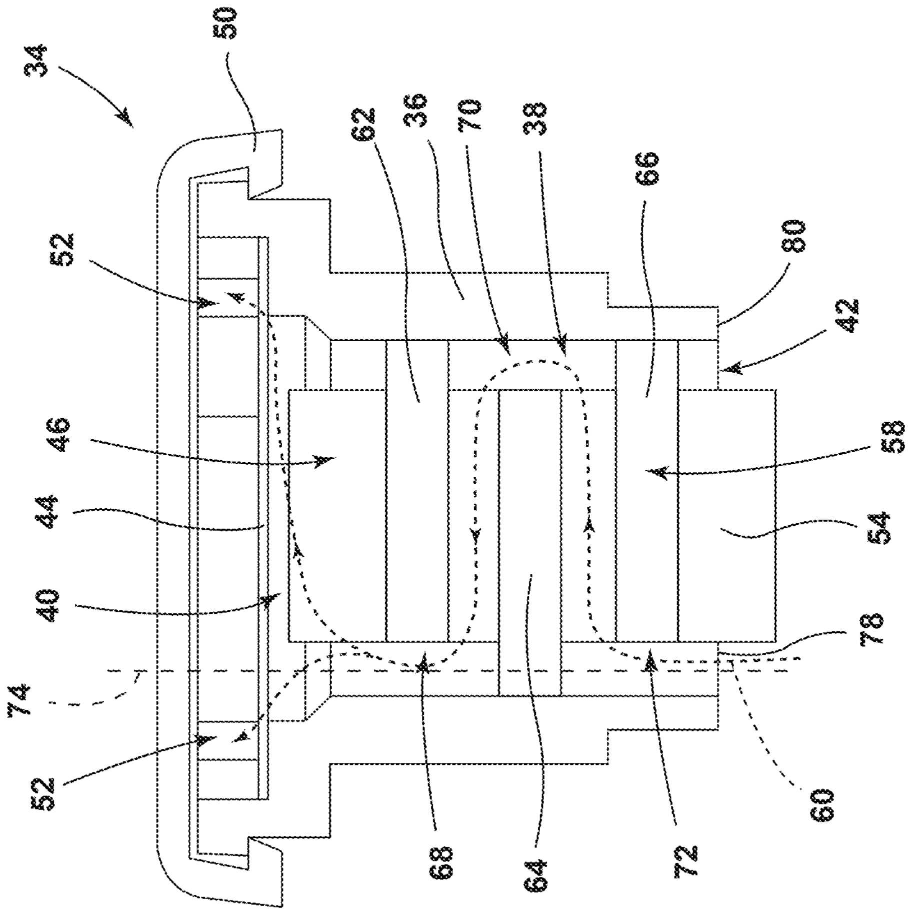
FIG. 3 is a cross-sectional view of a vent, illustrating a shield disposed within a casing and an air flow path cooperatively defined by the shield and the casing, according to one embodiment.
Figure 4:
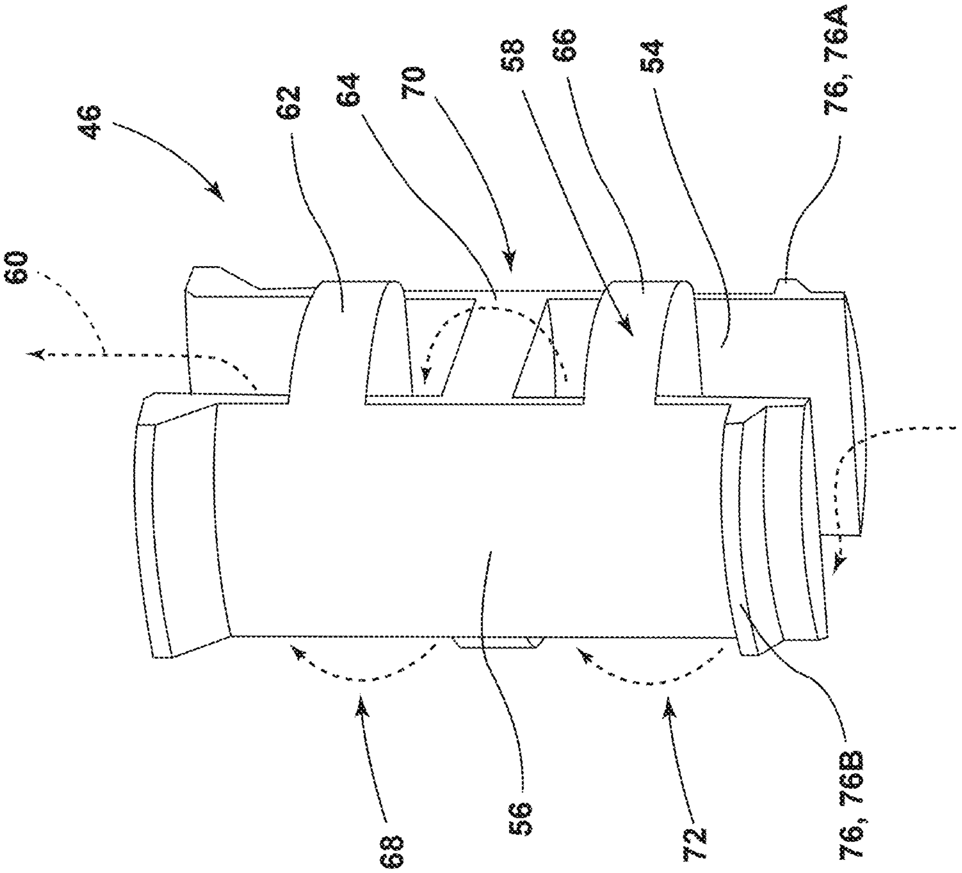
FIG. 4 is a perspective view of a shield of a vent, according to one embodiment.

Referring now to FIGS. 1 and 3-5, the assembly 10 for the vehicle includes the vent 34. The vent 34 includes the casing 36. The casing 36 defines the hollow 38 that extends from the first opening 40 to the second opening 42. As illustrated in FIGS. 1 and 3, the filter 44 extends across the first opening 40 and is configured to allow air to pass therethrough. A variety of types of filters 44 are contemplated. In an exemplary implementation, the filter 44 is an air-permeable mesh material. The vent 34 further includes a cap 50, as illustrated in FIGS. 1 and 3. The cap 50 extends over the casing 36 and the filter 44 to generally prevent large debris from coming in contact with or obstructing the filter 44. In the embodiment illustrated in FIG. 1, the cap 50 is engaged with the casing 36 via a snap-fit arrangement, such that the cap 50 is removably coupled with the casing 36. As further illustrated in FIG. 1, in various implementations, the casing 36 defines a plurality of ports 52 that are positioned between the cap 50 of the vent 34 and the hollow 38 defined by the casing 36. The ports 52 defined by the casing 36 are configured to allow air to vent therethrough.

Referring still to FIGS. 1 and 3-5, the vent 34 includes the shield. 46 The shield 46 extends within the hollow 38 defined by the casing 36 and is configured to allow air to pass therethrough and restrict oil 18 from passing therethrough. In various implementations, the shield 46 includes a first side member 54 and a second side member 56. The first and second side members 54, 56 extend lengthwise within the hollow 38 along the casing 36, as illustrated in FIG. 1. The shield 46 may include a restrictor structure 58 that extends between the first and second side members 54, 56. In some embodiments, the restrictor structure 58 of the shield 46 forms a labyrinth that is configured to restrict the passage of oil 18 therethrough and allow passage of air therethrough in a serpentine flow path 60.

In various embodiments, the restrictor structure 58 includes a first step 62 and a second step 64. The first and second steps 62, 64 extend between the first and second side members 54, 56 and are in a spaced relationship with each other. In the embodiment illustrated in FIGS. 1 and 3, the first step 62 is positioned between the first opening 40 of the hollow 38 and the second step 64 of the restrictor structure 58. As illustrated in FIGS. 1 and 3, in some embodiments, the restrictor structure 58 includes a third step 66. The third step 66 extends between the first and second side members 54, 56 and is in a spaced relationship with the first and second steps 62, 64, such that the second step 64 is positioned between the first and third steps 62, 66 of the restrictor structure 58. In some embodiments, the first step 62 cooperates with the casing 36 to define a first gap 68, the second step 64 cooperates with the casing 36 to define a second gap 70, and/or the third step 66 cooperates with the casing 36 to define a third gap 72. The first and second gaps 68, 70 may be offset from each other, such that an axis 74 extending parallel to a lengthwise direction of the first side member 54 that intersects the first gap 68 does not intersect the second gap 70. As illustrated in FIG. 3, wherein the first, second, and third steps 62, 64, 66 respectively define first, second, and third gaps 68, 70, 72, the axis 74 that extends parallel to the lengthwise direction of the first side member 54 intersects the first gap 68, does not intersect the second gap 70, and intersects the third gap 72. As illustrated in FIG. 3, arranging the restrictor structure 58 in this manner results in air flowing along a serpentine flow path 60 through the restrictor structure 58 of the shield 46 before exiting the ports 52 defined by the casing 36. Further, the offset nature of the first, second, and/or third steps 62, 64, 66 of the restrictor structure 58 impedes the flow of oil 18 through the hollow 38.

Referring still to FIGS. 1 and 3-5, the shield 46 of the vent 34 includes at least one retention feature 76. The at least one retention feature 76 engages the casing 36 of the vent 34 to prevent removal of the shield 46 from the hollow 38 through the first opening 40. The at least one retention feature 76 may extend outward from at least one of the first side member 54 and the second side member 56 to engage an engagement face 78 of the casing 36 to prevent removal of the shield 46 from the hollow 38 through the first opening 40. In some embodiments, the engagement face 78 is formed at an end 80 of the casing 36 that defines the second opening 42. It is contemplated that the engagement face 78 may be between the end 80 that defines the second opening 42 and the first opening 40 of the hollow 38, in some implementations.

Figure 5:
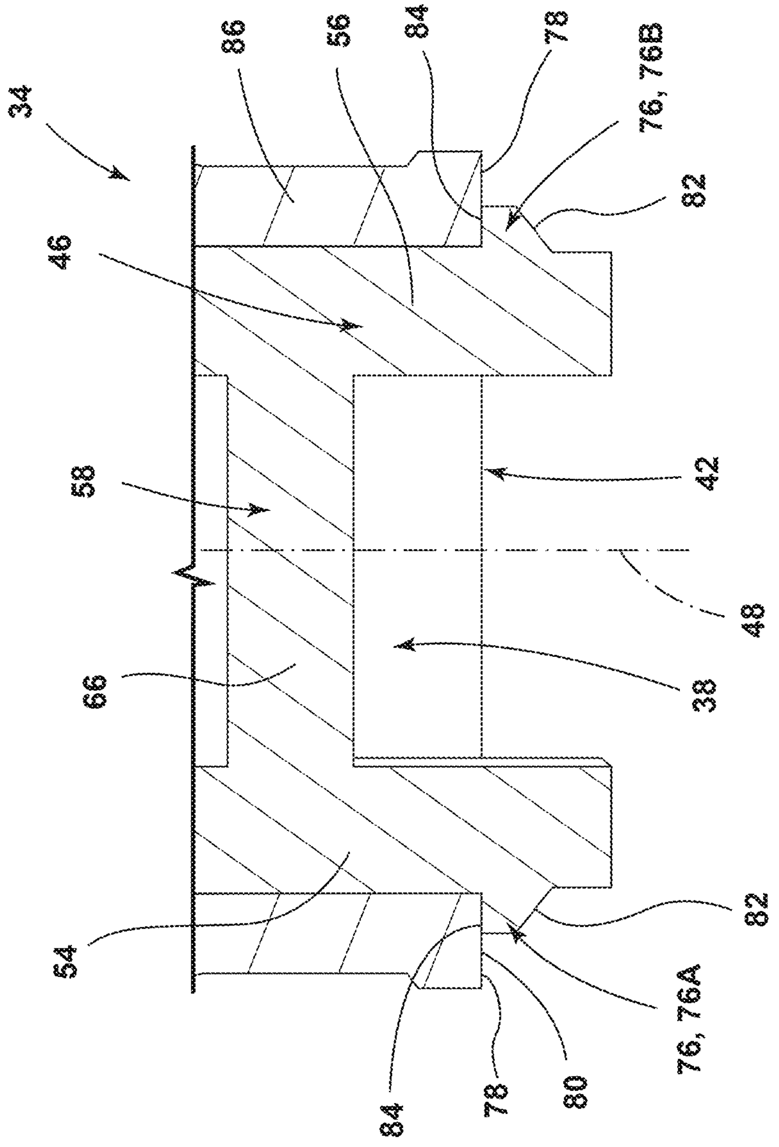
FIG. 5 is an enlarged view of Area V of FIG. 1, illustrating a portion of a casing of the vent and a shield that includes first and second retention features, according to one embodiment.

In various embodiments, the at least one retention feature 76 of the shield 46 comprises a plurality of retention features 76. For example, the at least one retention feature 76 may include a first retention feature 76A and a second retention feature 76B, as illustrated in FIG. 1. As illustrated in FIG. 5, the first retention feature 76A extends outward from the first side member 54 and includes a deflector portion 82 and a stop portion 84. The deflector portion 82 is configured to contact the casing 36 during insertion of the shield 46 into the hollow 38, such that the first side member 54 elastically deforms toward the second side member 56 as the first retention feature 76A travels toward the engagement face 78 of the casing 36. The first side member 54 resiliently rebounds away from the second side member 56 as the deflector portion 82 travels beyond the engagement face 78 of the casing 36. The stop portion 84 is configured to abut the engagement face 78 of the casing 36, as illustrated in FIG. 5, to prevent removal of the shield 46 from the hollow 38 through the first opening 40. In the illustrated embodiment, the engagement face 78 of the casing 36 is formed at the end 80 of the casing 36 that defines the second opening 42, such that the first side member 54 extends through the second opening 42 and the first retention feature 76A is positioned outside of the hollow 38.

As further illustrated in FIG. 5, the second retention feature 76B extends outward from the second side member 56 and includes a deflector portion 82 and a stop portion 84. The deflector portion 82 of the second retention feature 76B is configured to contact the casing 36 during insertion of the shield 46 into the hollow 38, such that the second side member 56 elastically deforms toward the first side member 54 as the second retention feature 76B travels toward the engagement face 78 of the casing 36 and resiliently rebounds away from the first side member 54 as the deflector portion 82 of the second retention feature 76B travels beyond the engagement face 78 of the casing 36. With the deflector portion 82 of the second retention feature 76B beyond the engagement face 78 of the casing 36, the stop portion 84 of the second retention feature 76B is configured to abut the engagement face 78 to prevent removal of the shield 46 from the hollow 38 through the first opening 40.

As illustrated in FIG. 1, the vent 34 is configured to be inserted into the receiving cavity 30 defined by the exterior surface 20 of the housing 12. In various implementations, the vent 34 is inserted parallel to the axis 48 shown in FIG. 1. As further illustrated in FIG. 1, in various implementations, the vent 34 includes a seal 86. In an exemplary embodiment, the seal 86 may be an o-ring formed of resilient material that is configured to extend between the casing 36 of the vent 34 and the side wall 26 of the exterior surface 20 of the housing 12, forming a seal therebetween.

The present disclosure may provide a variety of advantages. First, the housing 12 of the assembly 10 having the aperture 32 extend through the side wall 26 of the exterior surface 20 rather than the floor 24 of the exterior surface 20 may discourage oil 18 from flowing into the aperture 32 and out of the housing 12 while allowing air to flow freely through the aperture 32. Second, the at least one retention feature 76 may allow for convenient assembly and retention of the shield 46 relative to the casing 36 of the vent 34. Third, the restrictor structure 58 may allow air to flow along the flow path 60 while restricting oil 18 from passing therethrough.

It is to be understood that variations and modifications can be made on the aforementioned structure without departing from the concepts of the present disclosure, and further it is to be understood that such concepts are intended to be covered by the following claims unless these claims by their language expressly state otherwise.

LIST OF REFERENCE NUMERALS

10 assembly
12 housing
14 interior surface
16 volume
18 oil/fluid
20 exterior surface
22 receiving portion
24 floor
26 side wall
28 end of side wall
30 receiving cavity
32 aperture
34 vent
36 casing
38 hollow
40 first opening
42 second opening
44 filter
46 shield
48 axis
50 cap
52 ports
54 first side member
56 second side member
58 restrictor structure
60 flow path
62 first step
64 second step
66 third step
68 first gap
70 second gap
72 third gap
74 axis
76 retention feature
76A first retention feature
76B second retention feature
78 engagement face
80 end of the casing
82 deflector portion
84 stop portion
86 seal

What is claimed is:

1. A vent, comprising:
a casing that defines a hollow that extends from a first opening to a second opening;
a filter that extends across the first opening and is configured to allow air to pass therethrough; and
a shield that extends within the hollow defined by the casing configured to allow air to pass therethrough and restrict oil from passing therethrough, the shield having at least one retention feature that engages the casing to prevent removal of the shield from the hollow through the first opening, wherein the shield includes first and second side members that extend lengthwise within the hollow along the casing and a restrictor structure that extends between the first and second side members, wherein the at least one retention feature comprises a first retention feature and extends outward from at least one of the first and second side members to engage an engagement face of the casing to prevent removal of the shield from the hollow through the first opening, wherein the engagement face is formed at an end of the casing that defines the second opening, such that the first side member extends through the second opening and the first retention feature is positioned outside of the hollow.

2. The vent of claim 1, wherein the first retention feature extends outward from the first side member and includes a deflector portion and a stop portion, wherein the deflector portion is configured to contact the casing during insertion of the shield into the hollow, such that the first side member elastically deforms toward the second side member as the first retention feature travels toward the engagement face of the casing and resiliently rebounds away from the second side member as the deflector portion travels beyond the engagement face of the casing, and wherein the stop portion is configured to abut the engagement face of the casing to prevent removal of the shield from the hollow through the first opening.

3. The vent of claim 2, wherein the at least one retention feature further comprises a second retention feature that extends outward from the second side member and includes a deflector portion and a stop portion, wherein the deflector portion of the second retention feature is configured to contact the casing during insertion of the shield into the hollow, such that the second side member elastically deforms toward the first side member as the second retention feature travels toward the engagement face of the casing and resiliently rebounds away from the first side member as the deflector portion of the second retention feature travels beyond the engagement face of the casing, and wherein the stop portion of the second retention feature is configured to abut the engagement face of the casing to prevent removal of the shield from the hollow through the first opening.

4. The vent of claim 1, wherein the restrictor structure of the shield forms a labyrinth configured to restrict passage of oil therethrough and allow passage of air therethrough in a serpentine flow path.

5. The vent of claim 4, wherein the restrictor structure includes first and second steps that extend between the first and second side members and are in a spaced relationship with each other, such that the first step is positioned between the first opening and the second step.

6. The vent of claim 5, wherein the first step cooperates with the casing to define a first gap, and the second step cooperates with the casing to define a second gap.

7. The vent of claim 6, wherein the first and second gaps are offset from each other, such that an axis extending parallel to a lengthwise direction of the first side member that intersects the first gap does not intersect the second gap.

8. The vent of claim 7, wherein the restrictor structure further includes a third step that extends between the first and second side members and is in a spaced relationship with the first and second steps, such that the second step is positioned between the first and third steps, and wherein the third step cooperates with the casing to define a third gap that the axis intersects.

9. The vent of claim 1, further comprising:

a cap that engages the casing and extends over the filter.

10. The vent of claim 9, wherein the casing defines a plurality of ports positioned between the cap and the hollow.

11. An assembly for a vehicle, comprising:

a housing, comprising:

an interior surface that defines a volume configured to receive oil therein; and an exterior surface opposite the interior surface and having a receiving portion that includes a floor and a side wall extending from the floor to an end of the side wall, wherein the floor and the side wall cooperate to define a receiving cavity, and wherein the side wall of the receiving portion defines an aperture that extends from the exterior surface to the interior surface; and a vent received within the receiving cavity and comprising:

a casing that defines a hollow that extends from a first opening to a second opening;

a filter that extends across the first opening and is configured to allow air to pass therethrough; and a shield that extends within the hollow defined by the casing configured to allow air to pass therethrough and restrict oil from passing therethrough, wherein the shield includes at least one retention feature that engages the casing and first and second side members that extend lengthwise within the hollow along the casing and a restrictor structure that extends between the first and second side members, wherein the at least one retention feature comprises a first retention feature and extends outward from at least one of the first and second side members to engage an engagement face of the casing to prevent removal of the shield from the hollow through the first opening, wherein the engagement face is formed at an end of the casing that defines the second opening, such that the first side member extends through the second opening and the first retention feature is positioned outside of the hollow.

12. The assembly of claim 11, wherein the at least one retention feature engages the casing to prevent removal of the shield from the hollow through the first opening.

13. The assembly of claim 11, wherein the aperture is adjacent to the floor of the receiving portion.

14. The assembly of claim 11, wherein the first retention feature extends outward from the first side member and includes a deflector portion and a stop portion, wherein the deflector portion is configured to contact the casing during insertion of the shield into the hollow, such that the first side member elastically deforms toward the second side member as the first retention feature travels toward the engagement face of the casing and resiliently rebounds away from the second side member as the deflector portion travels beyond the engagement face of the casing, and wherein the stop portion is configured to abut the engagement face of the casing to prevent removal of the shield from the hollow through the first opening.

15. The assembly of claim 11, wherein the aperture extends in a direction substantially perpendicular to an axis about which at least a portion of the side wall extends.

* * * * *